US012810844B2

(12) United States Patent
Youssef et al.

(10) Patent No.: US 12,810,844 B2
(45) Date of Patent: Nov. 24, 2026

(54) ELECTRONIC DEVICE AND METHOD FOR EFFICIENT KEYWORD SPOTTING

(71) Applicant: Samsung Electronics Co., Ltd., Gyeonggi-do (KR)

(72) Inventors: Ahmed Taha Elthakeb Naguib Youssef, San Diego, CA (US); Mostafa El-Khamy, San Diego, CA (US)

(73) Assignee: Samsung Electronics Co., Ltd. (KR)

( * ) Notice: Subject to any disclaimer, the term of this patent is extended or adjusted under 35 U.S.C. 154(b) by 141 days.

(21) Appl. No.: 18/819,226

(22) Filed: Aug. 29, 2024

(65) Prior Publication Data

US 2025/0201244 A1 Jun. 19, 2025

Related U.S. Application Data

(60) Provisional application No. 63/611,544, filed on Dec. 18, 2023.

(51) Int. Cl.

| | |
|---|---|
| ***G10L 15/08*** | (2006.01) |
| ***G06N 3/0464*** | (2023.01) |
| ***G06N 3/08*** | (2023.01) |
| ***G10L 15/22*** | (2006.01) |
| ***G10L 25/03*** | (2013.01) |

(52) U.S. Cl.

CPC ............ *G10L 15/08* (2013.01); *G06N 3/0464* (2023.01); *G06N 3/08* (2013.01); *G10L 15/22* (2013.01); *G10L 25/03* (2013.01); *G10L 2015/088* (2013.01); *G10L 2015/223* (2013.01)

(58) Field of Classification Search

CPC ........ G06N 3/08; G06N 3/0464; G10L 15/08; G10L 2015/088

See application file for complete search history.

(56) References Cited

U.S. PATENT DOCUMENTS

| | | | | |
|---|---|---|---|---|
| 10,319,374 | B2 | 6/2019 | Catanzaro et al. | |
| 11,790,930 | B2 | 10/2023 | Wang et al. | |
| 2018/0261213 | A1* | 9/2018 | Arik | G10L 15/16 |
| 2020/0051551 | A1 | 2/2020 | Sainath et al. | |
| 2020/0168208 | A1* | 5/2020 | Mitra | G10L 15/02 |

(Continued)

OTHER PUBLICATIONS

Drossos, Konstantinos, et al. "Sound event detection with depthwise separable and dilated convolutions." 2020 International Joint Conference on Neural Networks (IJCNN). IEEE, 2020.*

(Continued)

*Primary Examiner* — Shaun Roberts

(74) *Attorney, Agent, or Firm* — The Farrell Law Firm, P.C.

(57) ABSTRACT

A system and a method are disclosed for keyword spotting in a digital audio stream. The method includes processing the digital audio stream to extract a feature matrix; applying a set of one-dimensional temporal convolutions to the feature matrix to obtain a first convolved feature matrix; transposing time and frequency dimensions of the feature matrix to obtain a transposed matrix; applying a set of one-dimensional frequency convolutions to the transposed matrix to obtain a second convolved feature matrix; identifying a presence of a keyword based on further processing of a combination of the first and second convolved feature matrices; and performing a function in response to the presence of the keyword.

20 Claims, 9 Drawing Sheets

(56) References Cited

U.S. PATENT DOCUMENTS

| | | | | |
|---|---|---|---|---|
| 2021/0055778 A1* | 2/2021 | Myer | G06N 3/0495 | |
| 2021/0074270 A1* | 3/2021 | Ahn | G06N 3/045 | |
| 2021/0406662 A1* | 12/2021 | Timofejevs | G06N 3/049 | |
| 2022/0172028 A1 | 6/2022 | Qian et al. | | |
| 2022/0309344 A1 | 9/2022 | Kim et al. | | |
| 2023/0237713 A1* | 7/2023 | Wang | G06N 3/0442 345/582 | |

OTHER PUBLICATIONS

Chollet, François. "Xception: Deep learning with depthwise separable convolutions." Proceedings of the IEEE conference on computer vision and pattern recognition. 2017.*
Mitra, Vikramjit, and Horacio Franco. "Time-frequency convolutional networks for robust speech recognition." 2015 IEEE Workshop on Automatic Speech Recognition and Understanding (ASRU). IEEE, 2015.*
Seungwoo Choi et al., "Temporal Convolution for Real-time Keyword Spotting on Mobile Devices", Nov. 18, 2019, 5 pages.
Yundong Zhang et al. "Hello-Edge: Keyword Spotting on Microcontrollers", Feb. 14, 2018, 14 pages.
Somshubra Majumdar et al., "MatchboxNet: 1D Time-Channel Separable Convolutional Neural Network Architecture for Speech Commands Recognition", Apr. 21, 2020, 5 pages.
Byeonggeun Kim et al., "Broadcasted Residual Learning for Efficient Keyword Spotting", Jul. 5, 2023, 5 pages.
Pete Warden et al. "Speech Commands: A Dataset for Limited-Vocabulary Speech Recognition", Apr. 9, 2018, 11 pages.

* cited by examiner

ELECTRONIC DEVICE AND METHOD FOR EFFICIENT KEYWORD SPOTTING

CROSS-REFERENCE TO RELATED APPLICATION

This application claims the priority benefit under 35 U.S.C. § 119(e) of U.S. Provisional Application No. 63/611,544, filed on Dec. 18, 2023, the disclosure of which is incorporated by reference in its entirety as if fully set forth herein.

TECHNICAL FIELD

The disclosure generally relates to electronic devices and voice recognition technologies. More particularly, the subject matter disclosed herein relates to improvements in keyword spotting for voice assistants on electronic devices.

SUMMARY

In the field of voice-activated technologies, detecting specific wake-up words in a continuous stream of speech may be an important consideration to ensure efficient operation. Such functionality enables the activation of more complex speech processing tasks, including automatic speech recognition (ASR), without the need for these systems to be continuously running, thus conserving computational resources. Traditional keyword spotting approaches often struggle to balance the immediate responsiveness and high accuracy required for real-time operation on resource-constrained devices, such as mobile phones and smart home devices.

To solve this problem, existing solutions have primarily focused on optimizing either the computational efficiency or the accuracy of keyword spotting models. However, these optimizations often come at the expense of the other, leading to systems that are either fast but prone to errors or accurate but too slow for practical use. One issue with these approaches is the inherent challenge in designing neural network architectures that can efficiently process the temporal and spectral dimensions of audio data on devices with limited hardware capabilities.

To overcome these issues, systems and methods are described herein for an efficient neural network architecture that uniquely combines temporal convolution (TC) and frequency (spectral) convolution layers. This dual-convolution approach enables more effective feature extraction from audio signals, facilitating the rapid and accurate detection of wake-up words in real-time, even on devices with restricted hardware resources. By integrating these convolutional techniques, the proposed architecture efficiently balances computational demands with detection performance, offering a significant advancement in the field of on-device keyword spotting.

The above approaches improve on previous methods because they provide a scalable solution that is both highly accurate and capable of operating in real-time on resource-constrained devices. This advancement not only enhances the user experience by reducing false activations and missed wake-up words but also extends the battery life of mobile devices by optimizing the computational load required for continuous audio monitoring.

In an embodiment, a method is disclosed for keyword spotting in a digital audio stream. The method includes processing the digital audio stream to extract a feature matrix; applying a set of one-dimensional temporal convolutions to the feature matrix to obtain a first convolved feature matrix; transposing time and frequency dimensions of the feature matrix to obtain a transposed matrix; applying a set of one-dimensional frequency convolutions to the transposed matrix to obtain a second convolved feature matrix; identifying a presence of a keyword based on further processing of a combination of the first and second convolved feature matrices; and performing a function in response to the presence of the keyword.

In an embodiment, an apparatus for keyword spotting in a digital audio stream is provided. The apparatus comprises a memory storing instructions; and one or more processors configured to execute the instructions to process the digital audio stream to extract a feature matrix; apply a set of one-dimensional temporal convolutions to the feature matrix to obtain a first convolved feature matrix; transpose time and frequency dimensions of the feature matrix to obtain a transposed matrix; apply a set of one-dimensional frequency convolutions to the transposed matrix to obtain a second convolved feature matrix; identify a presence of a keyword based on further processing of a combination of the first and second convolved feature matrices; and perform a function in response to the presence of the keyword.

In an embodiment, a method is disclosed for enhancing keyword detection in a digital audio stream. The method includes executing a transformation of the digital audio stream into a feature matrix of Mel-frequency cepstral coefficients (MFCC); conducting one-dimensional depthwise separable convolutions on the feature matrix along temporal and frequency dimensions to obtain a convolved feature matrix; integrating the convolved feature matrix using a deep learning model with Swish activation functions to output a keyword detection result; and performing a function in response to the keyword detection result.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1:
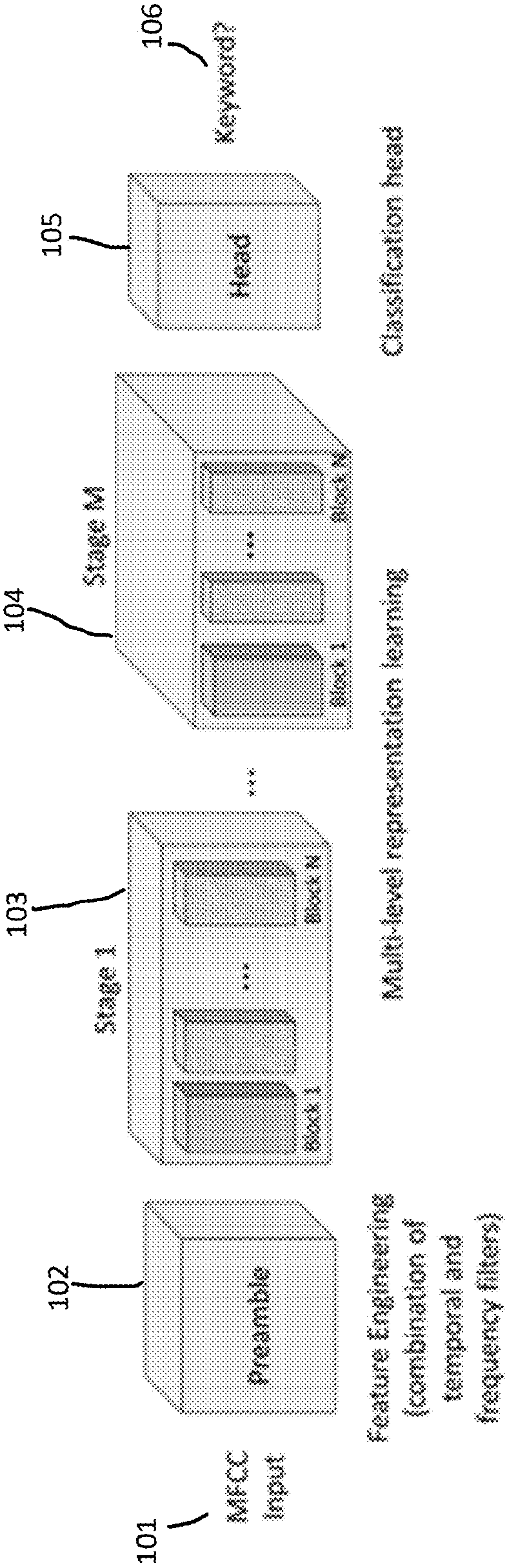
FIG. 1 is a high-level diagram of a neural network architecture for keyword spotting, according to an embodiment.

This disclosure presents an advanced method and system for efficiently detecting specific words or phrases, known as keywords, within a stream of spoken audio, particularly on mobile devices with limited processing capabilities. The disclosure includes novel neural network architecture that combines two types of one-dimensional (1D) convolutions: temporal and frequency.

TCs parse the audio data over time, capturing the changes and patterns as they unfold in the sequence of spoken words. Frequency convolutions (FCs), on the other hand, analyze the data across various pitch levels or frequency bands, picking up on the unique characteristics that differentiate sounds at different pitches.

By adeptly using the characteristics of convolution networks in 1D, the disclosure can more accurately and quickly pinpoint keywords in audio streams. This is especially beneficial for applications like voice-activated assistants, which need to constantly listen for specific activation words without draining the device's battery or resources.

The design also reduces the computational load through depthwise separable (DS) convolutions, a technique that simplifies the convolution process while still maintaining its effectiveness. This is complemented by the use of Swish activation functions, to help the system learn more effectively, especially as the network grows deeper and more complex.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

Keyword spotting is a frequently used function in the domain of voice-activated technologies, particularly for modern on-device voice assistants. These systems rely on the detection of predefined keywords or wake-up words from a continuous stream of audio signals to activate more complex ASR processes when necessary.

Convolutional neural network (CNN)-based approaches to keyword spotting leverage the power of convolutional operations to analyze audio signals for the presence of specific keywords. These techniques typically employ either 1D TCs or two-dimensional (2D) convolutions that consider both time and frequency dimensions to process the audio data. TCs operate along a single dimension, analyzing data across time, and are generally preferred for their lower computational resource requirements compared to 2D convolutions. However, a notable limitation of relying solely on TCs is their inability to capture the unique characteristics present across different frequency sub-bands, a critical aspect for accurately identifying diverse wake-up words within varied audio environments.

On the other hand, methods that utilize 2D convolutions, which analyze data across both frequency and time dimensions, offer a more comprehensive approach to processing audio signals. These models are capable of capturing a richer set of features from the audio stream, including variations across different frequency sub-bands, thereby potentially increasing the accuracy of keyword detection. Nevertheless, the trade-off for this increased accuracy comes in the form of higher computational demands. The 2D convolutional approaches may require more computational resources than their 1D counterparts, making them less suitable for deployment on resource-constrained mobile devices where efficiency is important.

Accordingly, the present Application proposes an electronic device and method for implementing keyword spotting that can offer the benefits of both temporal and frequency analysis without imposing excessive computational demands, thereby achieving efficiency improvements of hardware resources.

TC-residual network (ResNet) technologies, DS-CNN technologies, and MatchboxNet technologies, may each contribute valuable insights into the design of efficient, real-time keyword spotting systems.

TC-ResNet uses a ResNet comprised of blocks of 1D TC for on-device keyword spotting. DS-CNN recognizes the benefits of DS convolutional layers for keyword spotting architectures, especially in the context of microcontrollers and other resource-limited devices. MatchboxNet uses the utility of separable convolutions through its architecture that includes 1D temporal separable convolution within a ResNet framework for keyword spotting.

The technical solution in the present Application diverges from TC-ResNet, DS-CNN, and MatchboxNet by proposing a deeper residual network that combines 1D TC with 1D frequency (spectral) convolution (FC). This combination enhances the device's ability to process audio signals by capturing both time and frequency domain features more effectively. Additionally, the replacement of regular convolution layers with DS convolution layers and the incorporation of a Swish activation function, improves efficiency and performance on resource-constrained devices.

According to an embodiment, an electronic device comprising neural network architecture designed to address the challenges of efficient and accurate keyword spotting on mobile devices with constrained computational resources is provided.

Included in this architecture, which may be implemented by a circuit or one or more instructions stored in a memory, may be the combination of 1D TC and 1D FC. This unique pairing allows for an enhanced distinction and capture of unique characteristics present in audio signals, considering both the temporal and frequency dimensions. By analyzing audio data across different frequency sub-bands while maintaining temporal analysis, the device can more accurately identify specific wake-up words within a continuous stream of speech. This dual-convolution approach improves the ability to recognize keywords by exploiting the complementary nature of temporal and frequency information.

In addition, 1D DS convolution layers may be used to reduce the neural network's complexity without compromising its performance. By separating the convolution operation into DS and pointwise processes, the architecture achieves a substantial reduction in the number of parameters and computational demands.

Additionally, deep neural network architectures can represent complex functions and capture high-level features, more so than their shallower counterparts. This present disclosure applies deep representations through the efficient use of blocks based on 1D DS convolutions. The depth of the network, facilitated by these efficient convolutional blocks, allows for more expressive representations, enabling the model to achieve superior keyword spotting performance.

Furthermore, the incorporation of Swish activation within the 1D DS convolution layers further distinguishes the architecture provided by the electronic device disclosed herein. Positioned between the DS and pointwise convolution layers, Swish activation contributes to enhanced training performance, particularly for deeper architectures. Unlike a rectified linear unit (ReLU) activation function, Swish allows for the preservation of negative values and provides a smoother gradient flow. This characteristic is beneficial for deep neural networks, as it helps in mitigating issues related to vanishing gradients, thus facilitating more effective learning and generalization.

Accordingly, the electronic device and method for efficient keyword spotting disclosed herein may achieve competitive performance with significantly lower computational requirements, measured in the total count of arithmetic operations, compared to state-of-the-art models; achieve competitive performance with lower memory consumption (peak memory), compared to state-of-the-art models; and provide additional accuracy improvements based on the combination of TC and FC.

FIG. 1 is a high-level diagram of a neural network architecture for keyword spotting, according to an embodiment.

Referring to FIG. 1, the diagram illustrates the sequential flow of data processing from input to the final classification decision, separated into distinct stages and components.

At the beginning of the process, the MFCC input 101 represents the initial input to the system. These coefficients form a representation of the audio signal that the network will process to detect keywords.

Following the input is the preamble stage 102, which is responsible for feature engineering. This stage prepares the input by enabling the extraction of separate temporal and frequency filters followed by their smooth combination. The temporal filters analyze the data across the time domain, while the frequency filters analyze the data across the frequency domain. The combination of these filters prepares the model to better understand the time-series audio data by capturing both time and frequency characteristics.

After the preamble 102, the diagram shows a series of blocks labeled from "Block 1" to "Block N" within Stage 1 103 and continuing similarly in Stage M 104. These blocks represent the multi-level learning portion of the network, where deep learning occurs. Each block can be thought of as a layer or a group of layers within the neural network that processes and transforms the input data, learning hierarchical features at multiple levels of abstraction. There can be any number of blocks within each stage, and the stages themselves can be numerous (from Stage 1 to Stage M).

The cube labeled Head 105 denotes the classification head of the neural network that takes the learned representations and makes a final decision on whether a keyword is present in the input audio signal, outputting a binary or categorical result, depicted as "Keyword?" 106. Based on the keyword result, the electronic device may perform additional operations and processing (e.g., the electronic device may transmit information to another electronic device in response to a request associated with the keyword result).

Figure 2:
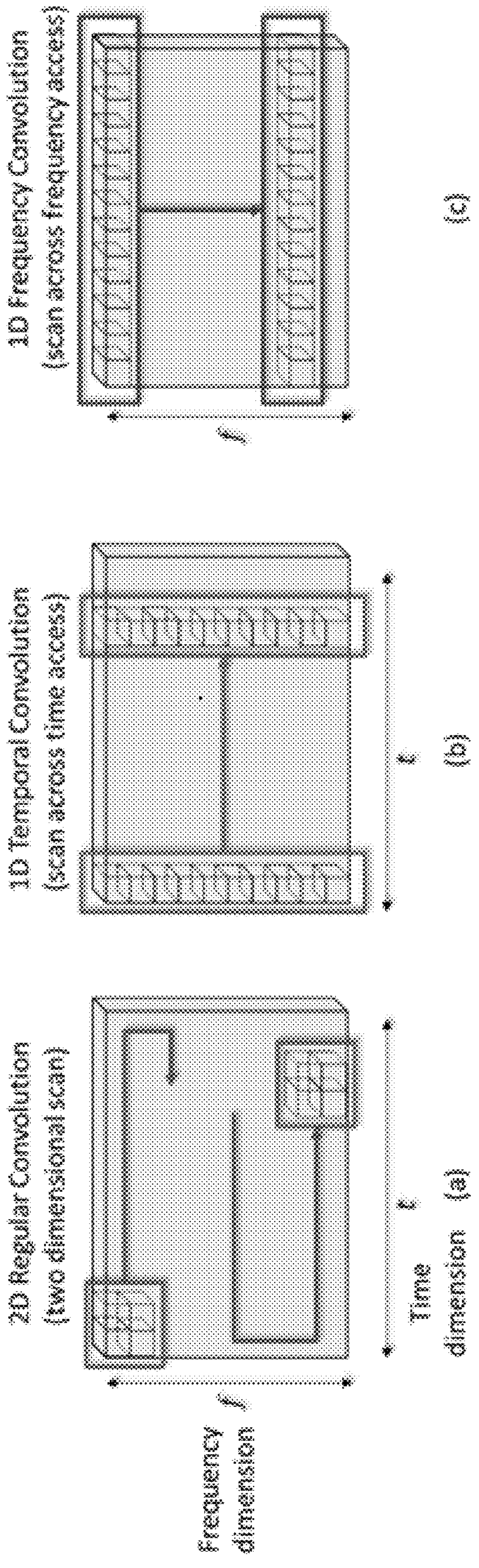
FIG. 2 is a diagram comparing different convolution styles, according to an embodiment.

FIG. 2 is a diagram comparing different convolution styles, according to an embodiment.

Referring to FIG. 2, three types of convolution operations are shown, highlighting their differences in processing audio signal data. Each sub-figure, (a), (b), and (c), demonstrates a different method of scanning through the input data which is represented in a two-dimensional format with time on one axis and frequency on the other.

FIG. 2(*a*), a "2D Regular Convolution," is a two-dimensional scan across both time and frequency dimensions. This type of convolution applies filters that move over both dimensions of the input, allowing the model to learn features that are a combination of time and frequency characteristics. The filter moves across the input field in 2D, covering both the time and frequency dimensions.

FIG. 2(*b*) shows a "1D Temporal Convolution," where the convolution is applied along the time axis. Here, the filters slide across the time dimension, treating the frequency dimension as separate channels. This approach focuses on learning temporal features from the audio signal and is computationally more efficient than 2D convolution since it involves scanning across a single dimension.

FIG. 2(*c*) shows a "1D Frequency Convolution," which scans across the frequency axis. In this embodiment, the convolution filters move along the frequency dimension, considering the time frames as input channels. This is different than TC of FIG. 2(*b*) and is useful for capturing frequency-specific features in the audio data.

Figure 3A:
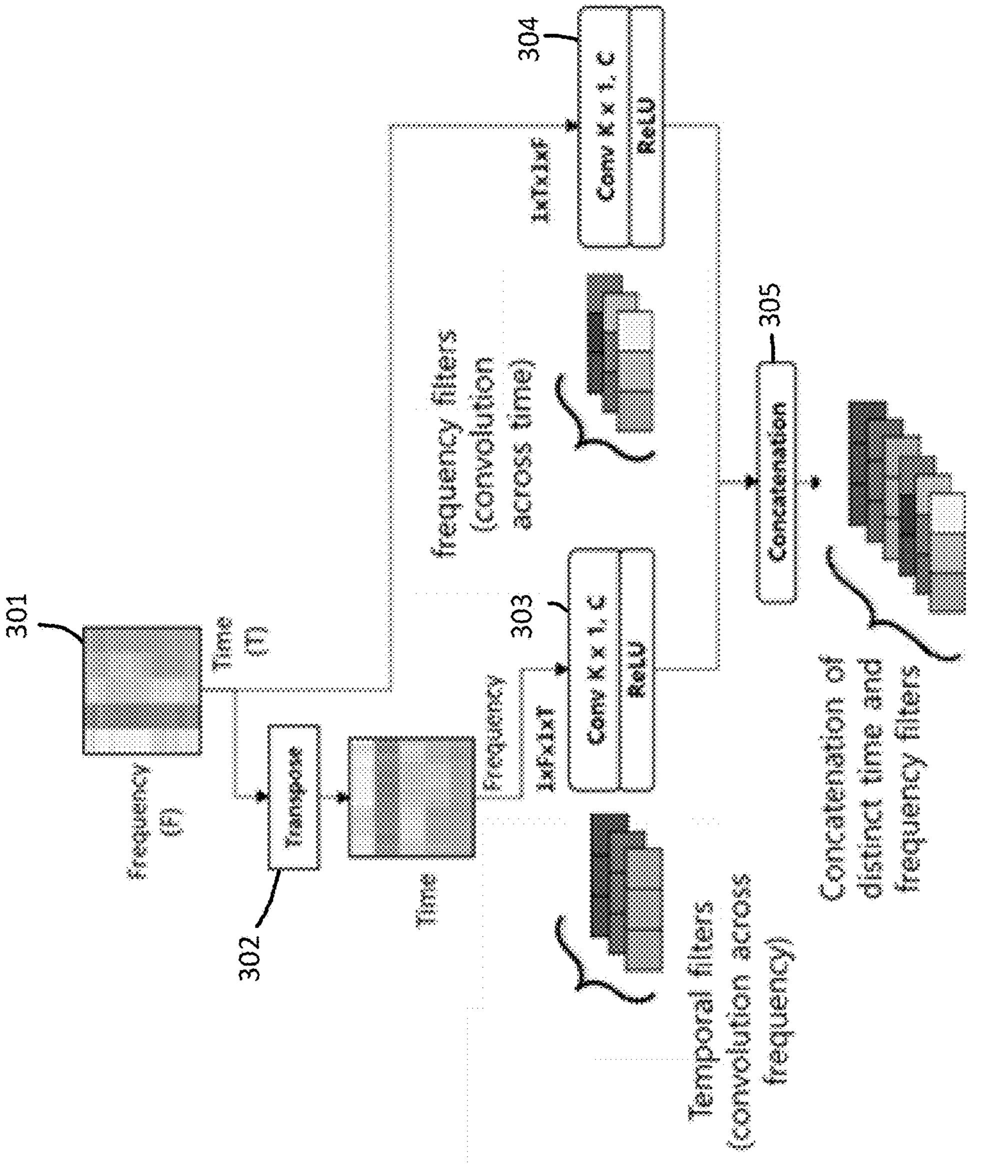
FIG. 3A is a diagram of the preamble component illustrating a combination of temporal and frequency filters, according to an embodiment.

FIG. 3A is a diagram of the preamble component illustrating a combination of temporal and frequency filters, according to an embodiment.

Referring to FIG. 3A, a rectangle 301 labeled with a "Frequency (F)" axis and a "Time (T)" axis represents the input MFCC feature matrix. This matrix is a time-frequency representation of the audio signal, where the frequency components are plotted against time.

The MFCC matrix undergoes a transposition in block 302. The transposition reorients the matrix such that the time and frequency dimensions are switched. The purpose of this transposition is to align the data for the subsequent filtering processes.

Following the transposition, frequency convolution occurs at block 303. Also, the original input 301 undergoes temporal convolution at block 304. Blocks 303 and 304 may occur in series (with either block occurring first in order) or in parallel. Each path processes the transposed MFCC matrix independently using different types of filters. The set of "Temporal filters" corresponding to block 303 apply 1D convolution across the frequency axis to capture the spectral characteristics of the audio signal. This convolution is denoted by "1×F×1×T," and the entire frequency dimension may be included in the filter's receptive field for each time instance. The convolution operation, "Conv K×1, C," may have a kernel of size K, and C may represent the number of filters applied. The operation is followed by a ReLU activation function, which introduces non-linearity into the processing.

The set of "Frequency filters" corresponding to block 304 perform a similar 1D convolution operation, but along the time axis. This operation captures the temporal characteristics of the audio signal is represented as "1×T×1×F," indicating that the entire time dimension is encompassed in the filter's receptive field for each frequency instance. The convolution and ReLU activation are similarly represented as "Conv K×1, C."

The final step in the preamble is the concatenation of the outputs from both temporal and frequency filters at block 305. The independently processed time and frequency features output after ReLU activation after blocks 303 and 304, respectively, are merged into a single combined feature set. This concatenated output may be fed into the main body of the network architecture, where feature extraction and classification occur. The stacked filters beneath the concatenation block 305 (labeled "Concatenation of independent time and frequency filters") represent the layering of time and frequency features, providing a richer and more descriptive input to the subsequent stages of the neural network.

3B is a diagram of the preamble component illustrating a combination of temporal and frequency filters for streaming and non-streaming input data, according to an embodiment.

Figure 3B:
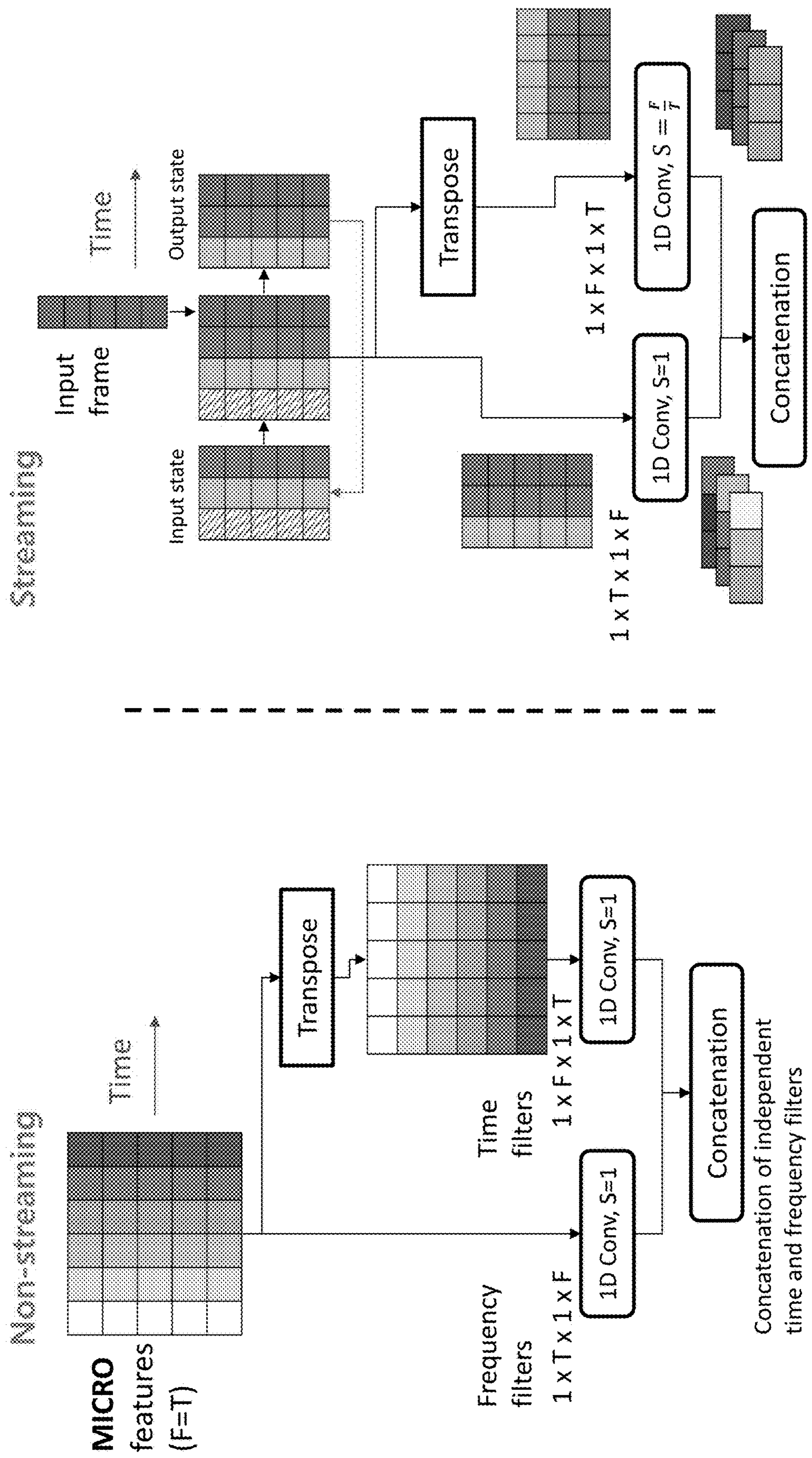
FIG. 3B is a diagram of the preamble component illustrating a combination of temporal and frequency filters for streaming and non-streaming input data, according to an embodiment.

FIG. 3B is similar to FIG. 3A, but further depicts specific use cases in which non-streaming data versus streaming data is provided as input into the preamble component. In this context streaming scenario is when the model receives portion of the input data sequence and classifies it incrementally. On the other hand, in the non-streaming scenario, the model receives the whole input sequence and then returns the classification result.

In the non-streaming data case, the model has to receive the whole sequence (for example 1 second of audio) and then return an output. This assumes pre-recorded audio data.

In the streaming data case, the model receives portion of the input sequence (for example 20 milliseconds (ms) of audio), processes it incrementally, and returns an output.

Figure 4:
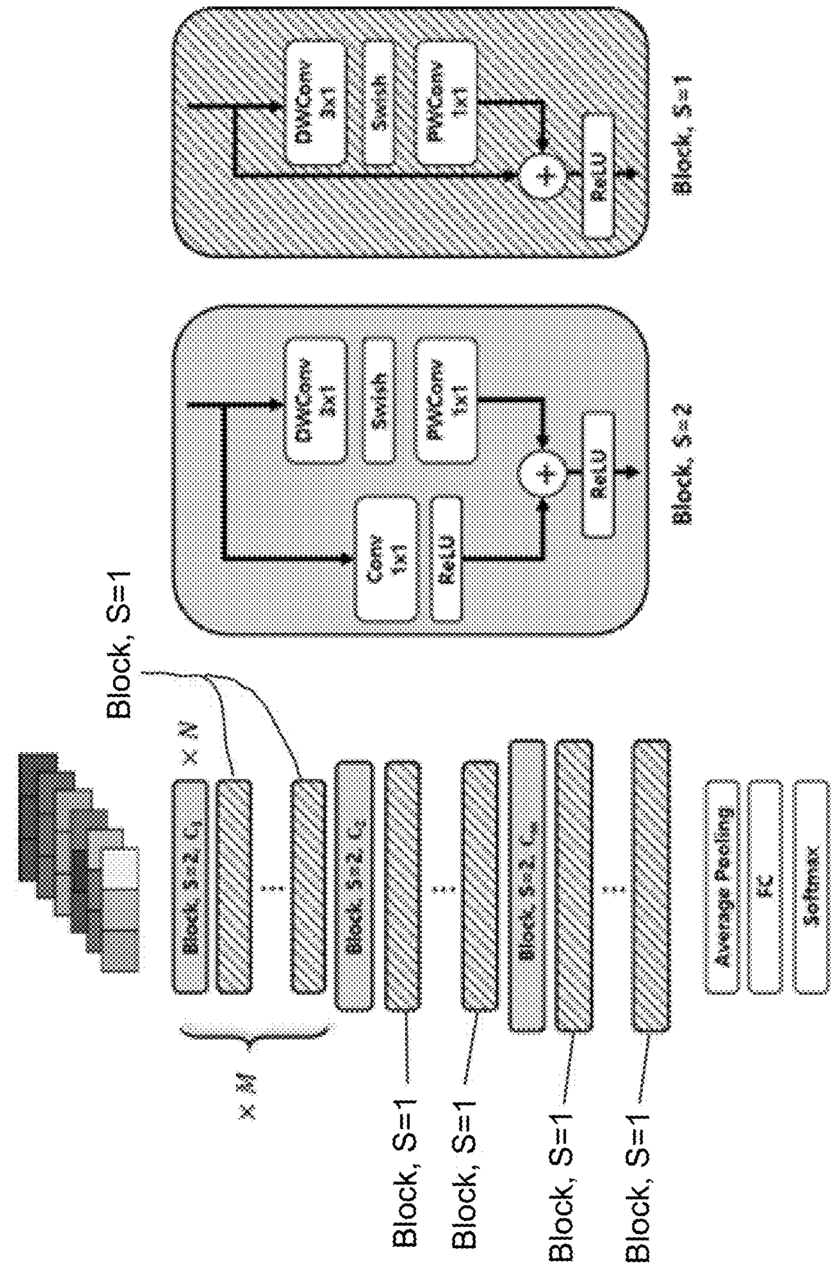
FIG. 4 is a low-level diagram detailing the constituent blocks of the neural network architecture for keyword spotting, according to an embodiment.

FIG. 4 is a low-level diagram detailing the constituent blocks for keyword spotting, according to an embodiment.

Referring to FIG. 4, on the left side of the diagram a cascading series of blocks, labeled from "Block, S=2, $C_1$" to "Block, S=2, $C_m$" are shown, where "S" represents stride and "C" represents a number of channels. These blocks signify the layers or sequences of operations that process the input features through the network. The stacked filters output from FIG. 3A (labeled "Concatenation of independent time and frequency filters" in FIG. 3A) may correspond to the stacked filters provided as input in FIG. 4. There can be "M" number of stages. Each stage has "N" number of same channel blocks. For example, each of the same channel blocks in a particular stage (one instance of M) may correspond to $C_1$. Thus, in this case, this stage (one instance of M) would have N number of $C_1$ channel blocks.

Each blocks' structure is depicted on the right side of the diagram, where two examples of blocks are shown with different values, "S=2" and "S=1". S=2 blocks are shown with a solid grey background and occur as the first block in sequence for each set of blocks in a stage M. S=1 blocks have a diagonal background and are repeated after the S=2 block for the remaining blocks for each stage.

Block S=2 is composed of several elements:

DWConv 3×1: This represents a depthwise convolution with a kernel size of 3×1, which performs filtering on each input channel independently. The convolution may be applied across three temporal or frequency units at each time instance.

Swish: This is the activation function that may be used to maintain a smooth gradient flow.

PWConv 1×1: Following the Swish is a pointwise convolution with a kernel size of 1×1. This operation combines the outputs of the depthwise convolution across a plurality of channels.

Conv 1×1: The filters may be convoluted with a kernel size of 1×1 in parallel with the DWConv3×1, Swish, and PWConv 1×1 operations. This Conv 1×1 step is necessary to adjust the number of channels for each S=2 block, to enable the addition of branches of a same size at the addition/combination operation (represented by "+").

ReLU: The ReLU activation function may be used to introduce non-linearity into the block and may be applied after the Conv 1×1 operation. In addition, this result may be combined with the result of the PWConv 1×1 operation (represented by "+"), and another instance of the ReLU activation function may be applied again on the combined result.

Block S=1 includes similar elements but instead of the Conv 1×1 and ReLU operations being performed in parallel (as in block S=2), the input filters are combined with the output of the PWConv 1×1 operation prior to the ReLU activation function. The parallel Conv 1×1 and ReLU operations are omitted from block S=1 because block S=2 is performed once per channel, and the Conv 1×1 operation is necessary to perform once as a first block for each set of blocks M to adopt a new channel.

After the final block of same channel blocks N, in the final stage of the number of stages M has been processed, then the output may undergo average pooling, fully connected ("FC" in FIG. 4), and Softmax operations. This may be part of the Classification head 105 shown in FIG. 1 The average pooling operation reduces the dimensionality of the data by computing the average value over a spatial window. The fully connected operation transforms the average pooled values into scores for each class. The Softmax operation is applied to the output of the fully connected block and converts the scores into normalized probabilities, indicating the likelihood of each keyword being present in the input data.

Accordingly, the architecture illustrated in FIG. 4 is adeptly designed for efficient processing by using 1D DW convolution in place of ordinary TC layers, increasing the number of blocks in the network, and replacing ReLU with Swish.

The entire sequence of operations, from the initial depthwise convolution to the final softmax function, is designed to systematically extract and refine features from the input data, leading to the accurate classification of keywords within an audio stream.

Figure 5A:
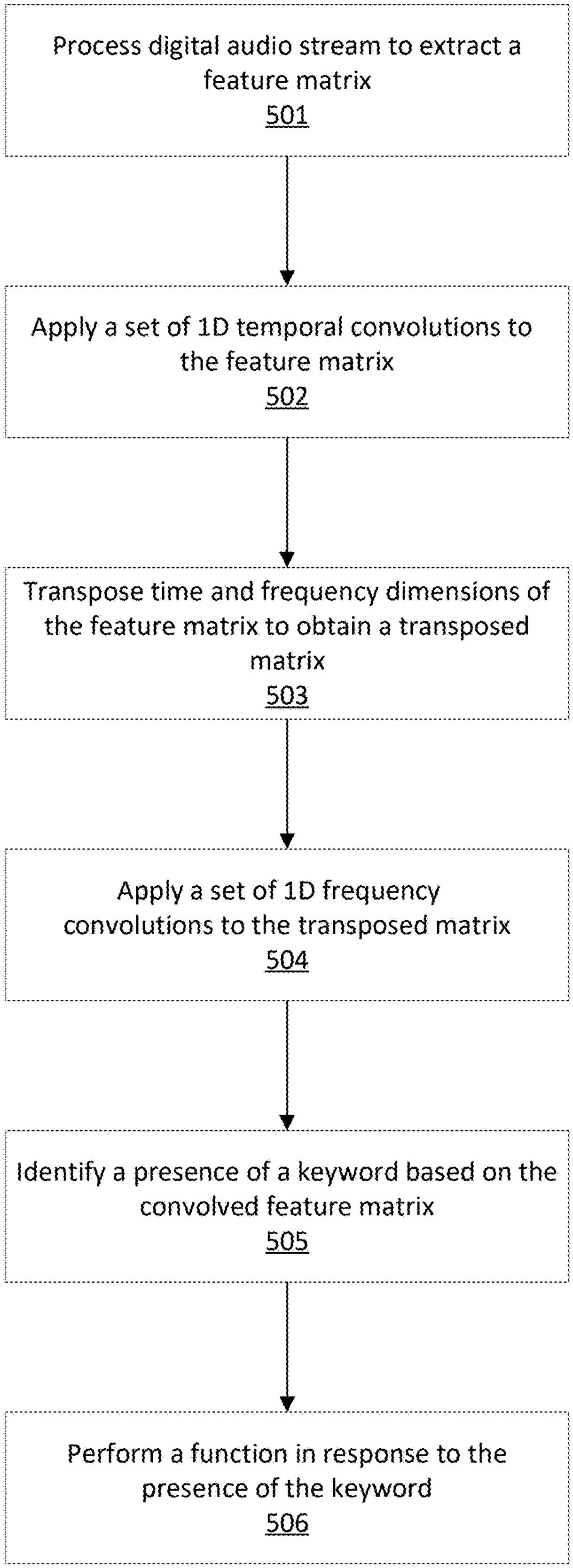
FIG. 5A illustrates a method for keyword spotting in a digital audio stream, according to an embodiment.

FIG. 5A illustrates a method for keyword spotting in a digital audio stream, according to an embodiment.

Any of the components, blocks, or elements, or a combination thereof, illustrated in FIGS. 1-4 and 6-7 can be used to perform one or more of the operations (steps) of the flow chart. Further, operations shown in FIG. 5A are examples operations, and may involve various additional steps not explicitly covered. Also, the temporal order of the operations in FIG. 5A may vary, and some implementations may omit one or more of the operations. Furthermore, one or more of the operations of FIG. 5A may be performed in series or in parallel.

Referring to FIG. 5A, in step 501, a digital audio stream is processed to extract a feature matrix. The digital audio stream may be sensed using a microphone on an electronic device. Additionally, the digital audio stream may be received by the electronic device via a transceiver. The feature matrix may include temporal and frequency characteristics that may be independent analyzed using TC and FC convolution.

In step 502, a set of 1D temporal convolutions are applied to the feature matrix to obtain a first convolved feature matrix. Similar to block 304 in FIG. 3A, an output including temporal characteristics of the feature matrix may be obtained.

In step 503, the time and frequency dimensions of the feature matrix are transposed to obtain a transposed matrix.

In step 504, a set of 1D frequency convolutions are applied to the transposed matrix to obtain a second convolved feature matrix. Similar to block 303 in FIG. 3A, an output including temporal characteristics of the feature matrix may be obtained.

Steps 502-504 may be performed in series or in parallel. Since 1D convolution is applied in these steps, less processing power is necessary compared to cases in which 2D (or higher dimensions) convolution is applied.

In step 505, the presence of a keyword is identified based on the convolved feature matrix. The convolved feature matrix may be the concatenated output feature matrix from steps 502-504, after block 305 in FIG. 3A. The convolved feature matrix may include independent time and frequency filters output from steps 502 and 504, and may be a combination of part or all of each of the first and second convolved feature matrices.

In step 506, a function is performed in response to the presence of the keyword. For example, the electronic device may perform a function to transmit a command to request information from an external electronic device after identifying the presence of the keyword and a query associated with the keyword. Alternatively, if the keyword is not present, the electronic device may perform another function, such as entering a sleep mode or reducing power.

Figure 5B:
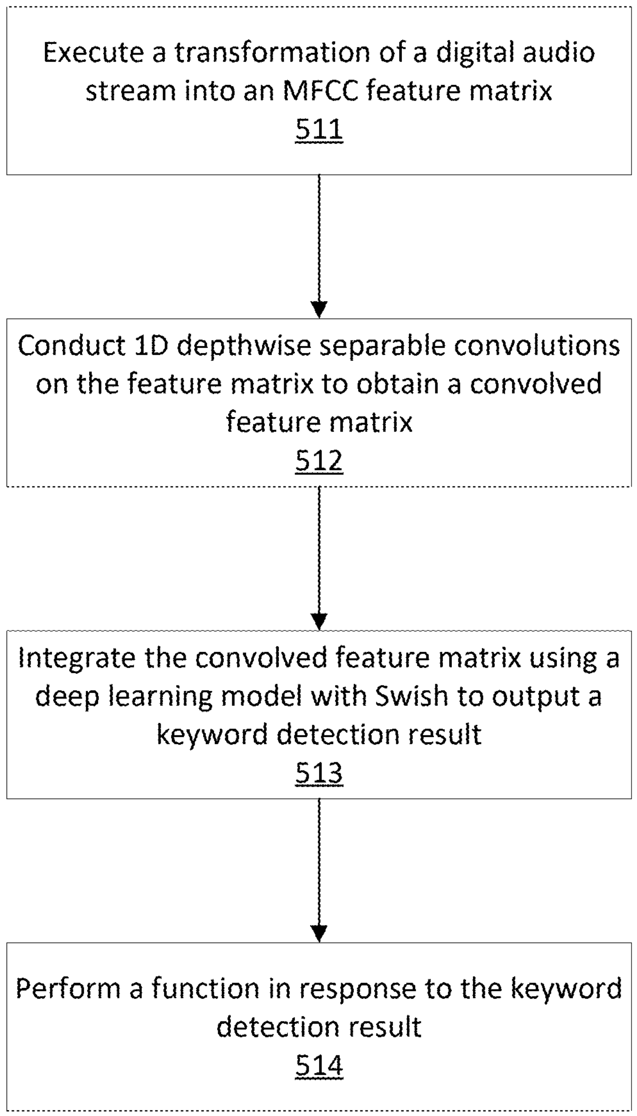
FIG. 5B illustrates a method for enhancing keyword detection in a digital audio stream, according to an embodiment.

FIG. 5B illustrates a method for enhancing keyword detection in a digital audio stream, according to an embodiment.

Any of the components, blocks, or elements, or a combination thereof, illustrated in FIGS. 1-4 and 6-7 can be used to perform one or more of the operations (steps) of the flow chart. Further, operations shown in FIG. 5B are examples operations, and may involve various additional steps not explicitly covered. Also, the temporal order of the operations in FIG. 5B may vary, and some implementations may omit one or more of the operations. Furthermore, one or more of the operations of FIG. 5B may be performed in series or in parallel. Additionally, some or all of the operations in FIG. 5B may be performed in addition to the operations shown in FIG. 5A, such that a method for keyword spotting and enhancing keyword detection in a digital audio stream may be performed.

Referring to FIG. 5B, in step 511, the digital audio stream is transformed in to a feature matrix of MFCC. In step 512, 1D depthwise separable convolutions are performed on the feature matrix along temporal and frequency dimensions to obtain a convolved feature matrix. In step 513, the convolved feature matrix is integrated using a deep learning model with Swish activation functions to output a keyword detection result. In step 514, a function is performed in response to the keyword detection result Accordingly, efficient keyword spotting and detection enhancement is a technical solution that may be implemented through hardware of an electronic device (e.g., a mobile device). The method of keyword spotting, as described, may begin with the capture of audio via a device's microphone, followed by the digital signal processor transforming these audio signals into a format suitable for analysis, such as MFCC. This process relies on the capabilities of the device's processor to perform 1D TCs and FCs, tasks that may demand significant computational power and are beyond mere mental processes.

The solution further involves DS convolutions, an advanced convolution technique that may rely on the parallel processing capabilities of contemporary central processing units (CPUs) or graphical processing units (GPUs) within the electronic device. Moreover, the Swish activation function may be used because of its compatibility with the non-linear processing capabilities of the hardware, requiring a processor to execute complex mathematical computations.

In addition, real-time processing necessitates low-latency operations, which depends on the processor's speed and the device's memory capabilities. Additionally, the keyword spotting method improves energy efficiency, which directly relates to hardware optimization, aiming to reduce battery drain while maintaining performance, which is fundamentally tied to the physical characteristics of the device's components.

Figure 6:
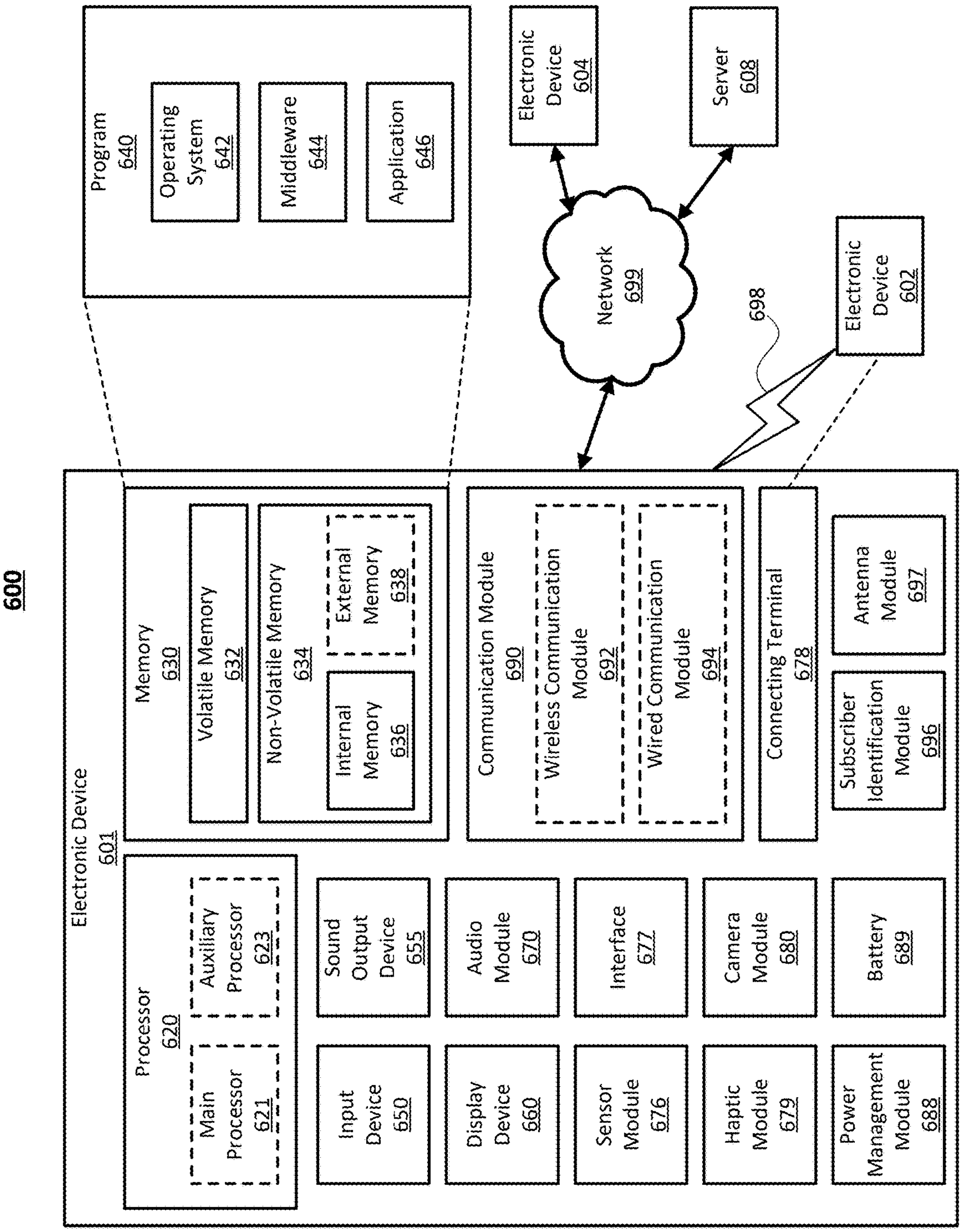
FIG. 6 is a block diagram of an electronic device in a network environment, according to an embodiment.

FIG. 6 is a block diagram of an electronic device in a network environment, according to an embodiment.

Referring to FIG. 6, an electronic device 601 in a network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) card 696, or an antenna module 697. In one embodiment, at least one (e.g., the display device 660 or the camera module 680) of the components may be omitted from the electronic device 601, or one or more other components may be added to the electronic device 601. Some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute software (e.g., a program 640) to control at least one other component (e.g., a hardware or a software component) of the electronic device 601 coupled with the processor 620 and may perform various data processing or computations.

As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a CPU or an application processor (AP)), and an auxiliary processor 623 (e.g., a GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). The auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634. Non-volatile memory 634 may include internal memory 636 and/or external memory 638.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. The display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. The audio module 670 may obtain the sound via the input device 650 or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. The interface 677 may include, for example, a high-definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. The connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. The haptic module 679 may include, for example, a motor, a piezoelectric element, or an electrical stimulator.

The camera module 680 may capture a still image or moving images. The camera module 680 may include one or more lenses, image sensors, image signal processors, or flashes. The power management module 688 may manage power supplied to the electronic device 601. The power management module 688 may be implemented as at least part of, for example, a power management integrated circuit (PMIC).

The battery 689 may supply power to at least one component of the electronic device 601. The battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. The communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as BLUETOOTH™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. The antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

Commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

Figure 7:
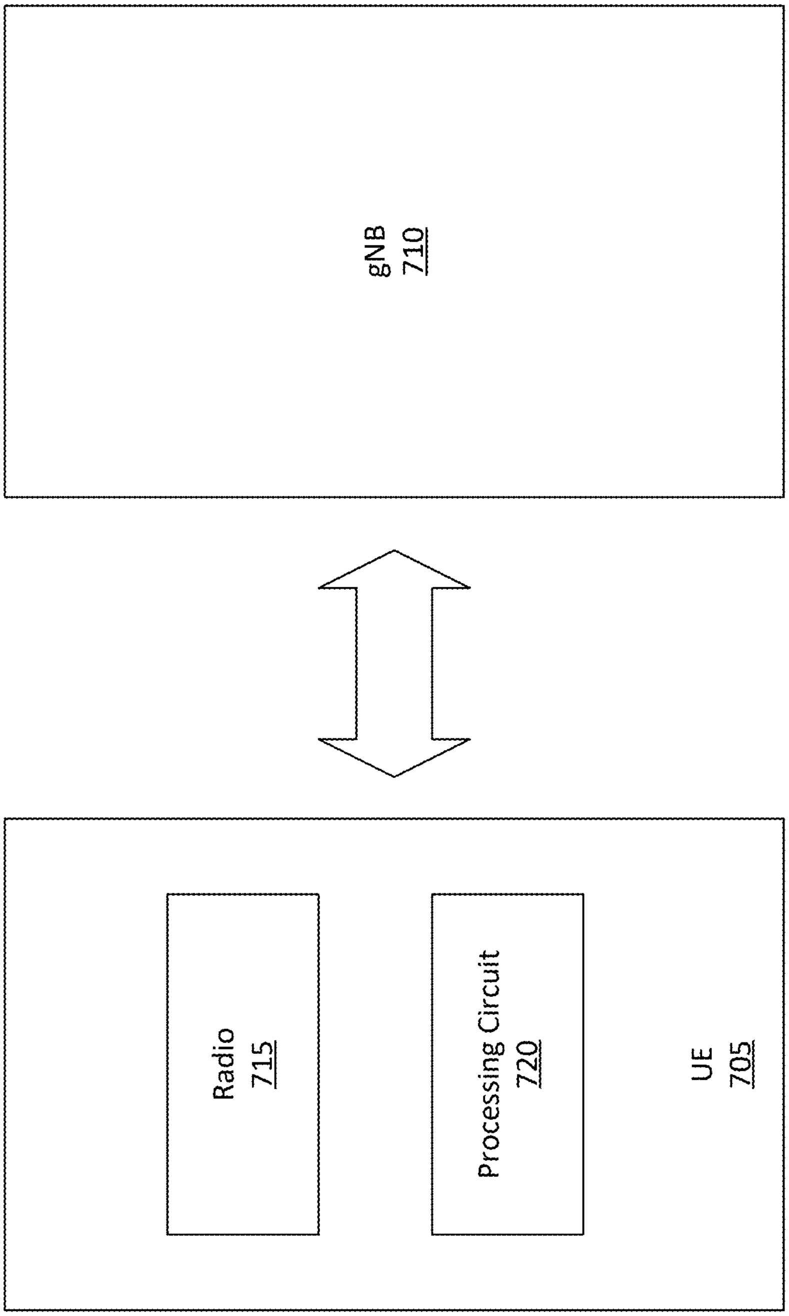
FIG. 7 shows a system including a user equipment (UE) and a network node (gNB) in communication with each other, according to an embodiment.

FIG. 7 shows a system including a UE and a gNB, in communication with each other, according to an embodiment.

Referring to FIG. 7, the UE 705 may include a radio 715 and a processing circuit (or a means for processing) 720, which may perform various methods disclosed herein, e.g., the method illustrated in FIGS. 5A-5B. For example, the processing circuit 720 may receive, via the radio 715, transmissions from the gNB 710, and the processing circuit 720 may transmit, via the radio 715, signals to the gNB 710.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method for keyword spotting in a digital audio stream, the method comprising:

processing the digital audio stream to extract a feature matrix;

applying a set of one-dimensional temporal convolutions to the feature matrix to obtain a first convolved feature matrix;

transposing time and frequency dimensions of the feature matrix to obtain a transposed matrix;

applying a set of one-dimensional frequency convolutions to the transposed matrix to obtain a second convolved feature matrix;

identifying a presence of a keyword based on further processing of a concatenation of the first and second convolved feature matrices; and performing a function in response to the presence of the keyword.

2. The method of claim 1, wherein the feature matrix is square, with a number of time slots equal to a number of frequency channels.

3. The method of claim 1, further comprising concatenating frequency filters obtained using the first convolved feature matrix with temporal filters obtained using the second convolved matrix.

4. The method of claim 3, wherein identifying the presence of the keyword includes:

implementing frequency and temporal separable convolutions using depthwise separable convolutions on the concatenating frequency and temporal filters, respectively.

5. The method of claim 4, wherein the depthwise separable convolutions are part of a deep residual network architecture comprising a plurality of residual blocks.

6. The method of claim 5, wherein the plurality of residual blocks employ Swish activation functions positioned between depthwise separable convolution layers.

7. The method of claim 1, wherein identifying the presence of the keyword further includes performing an average pooling operation.

8. The method of claim 1, wherein identifying the presence of the keyword further includes performing a classification using a fully connected layer followed by a softmax activation function.

9. The method of claim 1, wherein the method is executed on a mobile device.

10. An apparatus for keyword spotting in a digital audio stream, the apparatus comprising:

a memory storing instructions; and one or more processors configured to execute the instructions to:

process the digital audio stream to extract a feature matrix;

apply a set of one-dimensional temporal convolutions to the feature matrix to obtain a first convolved feature matrix;

transpose time and frequency dimensions of the feature matrix to obtain a transposed matrix;

apply a set of one-dimensional frequency convolutions to the transposed matrix to obtain a second convolved feature matrix;

identify a presence of a keyword based on further processing of a concatenation of the first and second convolved feature matrices; and perform a function in response to the presence of the keyword.

11. The apparatus of claim 10, wherein the feature matrix is square, with a number of time slots equal to a number of frequency channels.

12. The apparatus of claim 10, wherein the one or more processors are further configured to concatenate frequency filters obtained using the first convolved feature matrix with temporal filters obtained using the second convolved matrix.

13. The apparatus of claim 12, wherein identifying the presence of the keyword includes:

implementing frequency and temporal separable convolutions using depthwise separable convolutions on the concatenating frequency and temporal filters, respectively.

14. The apparatus of claim 13, wherein the depthwise separable convolutions are part of a deep residual network architecture comprising a plurality of residual blocks.

15. The apparatus of claim 14, wherein the plurality of residual blocks employ Swish activation functions positioned between depthwise separable convolution layers.

16. The apparatus of claim 10, wherein identifying the presence of the keyword further includes performing an average pooling operation.

17. The apparatus of claim 16, wherein identifying the presence of the keyword further includes performing a classification using a fully connected layer followed by a softmax activation function.

18. The apparatus of claim 10, wherein the instructions further cause the one or more processors to perform noise reduction on the digital audio stream before extracting the feature matrix.

19. A method for enhancing keyword detection in a digital audio stream, comprising:

executing a transformation of the digital audio stream into a feature matrix of Mel-frequency cepstral coefficients (MFCC);

transposing time and frequency dimensions of the feature matrix to obtain a transposed matrix;

conducting one-dimensional depthwise separable convolutions on the feature matrix and on the transposed matrix to obtain first and second convolved feature matrices;

integrating a concatenation of the first and second convolved feature matrices using a deep learning model with Swish activation functions to output a keyword detection result; and performing a function in response to the keyword detection result.

20. The method of claim 19, wherein the deep learning model comprises a set of concatenated residual blocks, each block configured to enhance feature discrimination for keyword detection.

* * * * *